July 26, 1960 LI-YEN CHEN 2,946,861

VACUUM TUBE HYBRID

Filed April 29, 1955

INVENTOR
LI-YEN CHEN

BY C. Chandler Pidgeon
AGENT

United States Patent Office 2,946,861

Patented July 26, 1960

2,946,861

VACUUM TUBE HYBRID

Li-Yen Chen, Canton, Kwang Tung, China, assignor to Directorate General of Telecommunications, Ministry of Communications, Taipei, Taiwan Filed Apr. 29, 1955, Ser. No. 504,997

8 Claims. (Cl. 179—170)

This invention relates to a vacuum tube hybrid for signal transmission between a two-wire circuit and a four-wire circuit, and more particularly to a telecommunication system such as may be applied to a voice frequency repeater, a carrier terminal, a radio terminal, etc.

A hybrid coil or a hybrid bridge has heretofore been widely used for signal transmission between a four-wire circuit and a two-wire circuit. In such cases, a balancing network is necessary to simulate the line impedance of the two-wire circuit. As line conditions may affect the line impedance, it is difficult to obtain a good balancing network. Furthermore, both the hybrid coil and the hybrid bridge introduce losses in the transmitted signals.

This invention relates to a vacuum tube hybrid which is superior to the hybrid coil or the hybrid bridge known in the prior art. With this invention a four-wire circuit can be coupled to a two-wire circuit without the use of a balancing network and results in a gain instead of a loss in the coupling circuit.

An object of this invention is the provision of means to transmit signals between a two-wire circuit and a four-wire circuit while avoiding signal leakage from the receiving branch of a four-wire circuit to the transmitting branch of the same.

Another object of this invention is the provision of means to couple a two-wire circuit to a four-wire circuit without the employment of a balancing network simulating the impedance of the two-wire circuit.

Another object of this invention is the provision of means to transmit signals between a two-wire circuit and a four-wire circuit without incurring loss, but preferably obtaining some gain.

A further object of this invention is the provision of a broad band coupling between a two-wire and a four-wire circuit, for use in carrier current circuits to separate incoming and outgoing signals.

A more specific object of this invention is the effective utilization of circuit elements whereby a vacuum tube hybrid may combine one or more of the functions of a receiving amplifier, a carrier amplifier, a modulator, a detector, a transmitting band pass filter and a receiving band pass filter.

Other objects and a fuller understanding of this invention may be had by reference to the following specification and claims taken in conjunction with the accompanying drawings in which like parts are designated by like reference characters.

Figure 1:
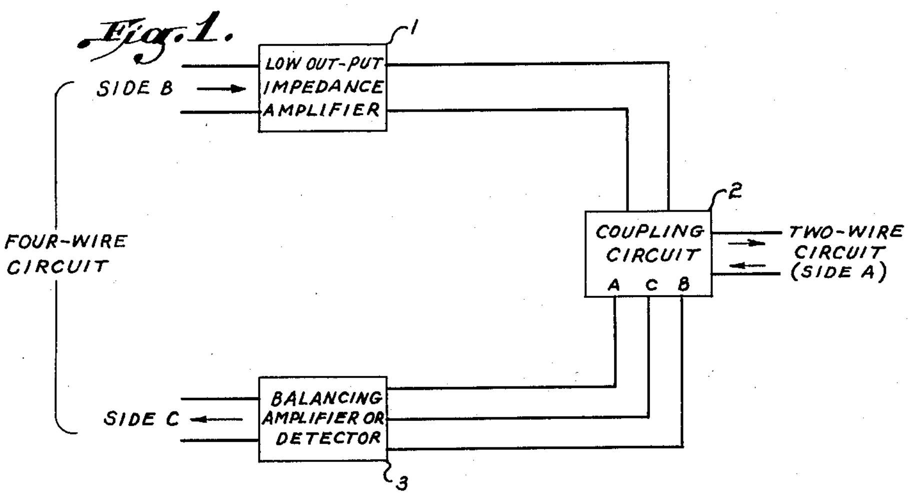
Fig. 1 is a block diagram of the vacuum tube hybrid.

Referring now to Fig. 1, which shows a vacuum tube hybrid comprising a low output impedance amplifier 1; a coupling circuit 2 and a balancing amplifier or detector 3. The low output impedance amplifier 1 transmits signals from side B of the four-wire circuit to the coupling circuit. The coupling circuit provides minimum loss to signals transmitted from side B to side A, and simultaneously feeds identical signals to the balancing amplifier (or detector) 3 so that no output is obtained on side C from side B.

However, when a signal comes from side A the low output impedance of the amplifier 1 virtually short circuits one branch of the coupling circuit connected to the balancing amplifier. In this state, the balancing amplifier becomes unbalanced and transmits the signal from side A to side C.

Figure 2:
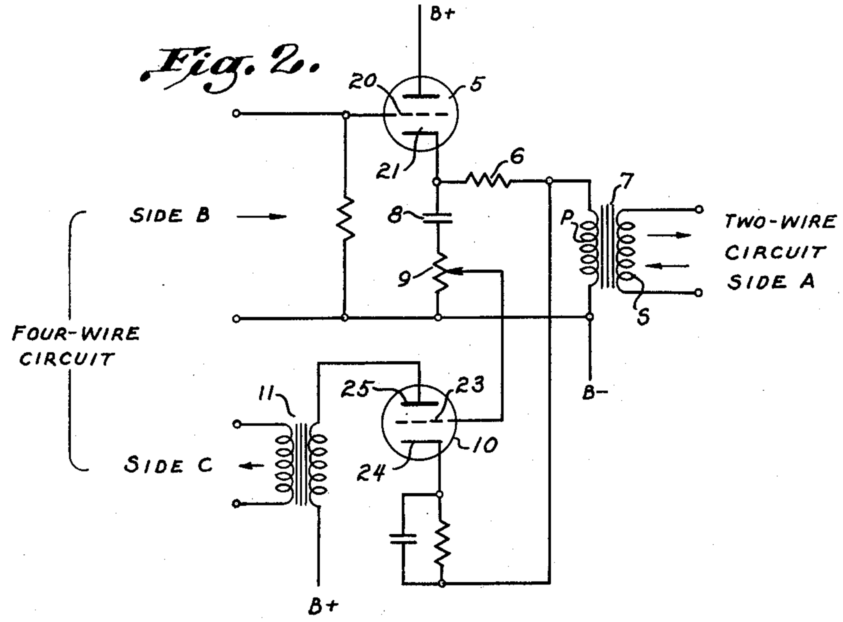
Fig. 2 shows an arrangement of the vacuum tube hybrid for voice circuits.

The general principles of the invention, as shown in Fig. 1, are further illustrated in Fig. 2 showing one arrangement of a vacuum tube hybrid wherein 5 represents an electron tube having a grid 20, a cathode 21 and an anode 22 operating as a cathode follower and used as a low impedance current amplifier to deliver signals to the coupling circuit which consists of a resistor 6, a transformer 7, a capacitor 8 and a potentiometer 9. An electron tube 10, having a grid 23, a cathode 24 and an anode 25 operates as a balanced amplifier to couple the input from the side A of a two-wire circuit to the side C of the four-wire circuit. The usual cathode bias resistor 26 and bypass condenser 27 are in the cathode circuit of tube 10.

A signal from side B of the four-wire circuit will be fed by the cathode follower coupling circuit to the transformer 7 and with the lines of side A. By suitable adjustment of the potentiometer 9 a point is reached where identical signals are impressed on the grid and cathode of the amplifier 10 and no signal will appear in the output of transformer 11 to feed into side C. Thus when the signal is from side A, the cathode potential of amplifier 10 will follow that signal. The output impedance of tube 5, operating as a cathode follower is so low that capacitor 8 and potentiometer 9 are practically short circuited. The amplifier 10, therefore, functions as a grounded grid amplifier in connection with a signal from side A, and passes the signal to side C.

In this hybrid, the tube 5 functions as a current amplifier and the amplifier 10 functions as a voltage amplifier. For ordinary tubes the gain in either direction is around 15 db. The output impedance of the cathode follower tube 5 being very low, line condition has little effect on the balance point on potentiometer 9.

A pad may be used on side A to reduce the effect of line impedance variation without causing too much overall loss in the hybrid circuit.

I claim:

1. A two-way repeater for coupling a two-wire to a four-wire line comprising a first electron discharge device have anode, cathode and control electrodes, a pair of parallel connected circuits in the cathode circuit of the first electron discharge device, each circuit including a pair of serially connected impedances, means coupling the outgoing signals from one side of the four-wire line between the control electrode and the pair of circuits at a point remote from the cathode electrode of the first electron discharge device, the values of the impedances being such that substantially no output signals appear across the junction points formed between the serially connected impedances of the parallel circuits upon energization of the first electron discharge device by the outgoing signals, means coupling the two-wire line to an impedance in one of said parallel circuits to transmit the outgoing signals, a second electron discharge device having anode, cathode and control electrodes, the control and cathode electrodes of the second electron discharge device being coupled respectively to said junction points, and means coupling the anode electrode of said second electron discharge device to the other side of the four-wire line for transmitting incoming signals from said two-wire line.

2. A two way repeater in accordance with claim 1, in which the one parallel circuit has a substantially higher impedance than the other of the parallel circuits whereby the first electron discharge device will not be energized by the incoming signals from the two-wire line.

3. A two way repeater in accordance with claim 1 in which the impedance to which the two wire line is coupled comprises a winding of a transformer, the two wire line being connected to a second winding of the transformer.

4. A two way repeater in accordance with claim 3 in which the other serially connected impedance in the one arm is a resistance.

5. A two way repeater in accordance with claim 1 in which the other parallel circuit includes a potentiometer having an adjustable arm forming the junction point of said other parallel circuit.

6. A two way repeater in accordance with claim 3 in which the cathode electrode of the first electron discharge device is coupled to one end of said potentiometer by a capacitor.

7. A two way repeater for coupling a two-wire to a four-wire line comprising, a first electron discharge device having anode, cathode and control electrodes, a pair of parallel connected impedance arms in the cathode circuit of said first electron discharge device, one of said arms including a resistance serially connected to one winding of a transformer, the other arm including a potentiometer coupled to the cathode of the first electron discharge device through a capacitance, a slider for said potentiometer, means coupling the outgoing signals from one side of the four-wire line between the control electrode and the end of said impedance arms remote from the cathode, said slider being adjustable to select a point on said potentiometer having a voltage which is equal to that at the junction of the resistance and the winding when the first electron discharge device is energized by the outgoing signals, a second winding on the transformer coupled to the two-wire line, a second electron discharge device having anode, cathode and control electrodes, of which the control and cathode electrodes are coupled respectively to the slider and to said junction and means coupling the anode electrode of the second electron discharge device to the other side of the four-wire line for transmitting incoming signals from said two-wire line.

8. A two way repeater in accordance with claim 7 in which the impedance of the other arm is much less than that of the one arm whereby the first electron discharge device remains unenergized by incoming signals from the two-wire line.

References Cited in the file of this patent

UNITED STATES PATENTS

| | | |
|---|---|---|
| 2,197,029 | Bast et al. | Apr. 16, 1940 |
| 2,496,266 | Brode et al. | Feb. 7, 1950 |
| 2,499,423 | Selinger | Mar. 7, 1950 |
| 2,511,948 | Wang | June 20, 1950 |
| 2,618,711 | Bourget | Nov. 18, 1952 |

UNITED STATES PATENT OFFICE
CERTIFICATION OF CORRECTION

July 26, 1960

Patent No. 2,946,861

Li-Yen Chen

It is hereby certified that error appears in the above numbered patent requiring correction and that the said Letters Patent should read as corrected below.

In the grant, lines 2 and 3, for "assignor to Directorate General of Telecommunications, Ministry of Communications, of Taiperi, Taiwan," read -- assignor to Directorate General of Telecommunications, Ministry of Communications, of Taipei, Taiwan, China, --; in the heading to the printed specification, lines 3, 4 and 5, for "assignor to Directorate General of Telecommunications, Ministry of Communications, Taipei, Taiwan" read -- assignor to Directorate General of Telecommunications, Ministry of Communications, Taipei, Taiwan, China --; in Fig. 2 of the drawings, the numeral 22 should be considered as being applied to the anode of the tube 5 and the numerals 26 and 27 should be considered as being applied to the resistor and condenser, respectively, which are connected to the cathode 24 of tube 10.

Signed and sealed this 11th day of July 1961.

(SEAL)
Attest:
ERNEST W. SWIDER
Attesting Officer

DAVID L. LADD
Commissioner of Patents